(No Model.)

R. STEVENS & W. I. MANN.
LUBRICATOR.

No. 283,361. Patented Aug. 14, 1883.

Witnesses:
Henry Aitken
John Beavan

Inventors
Richard Stevens
Wm. I. Mann

UNITED STATES PATENT OFFICE.

RICHARD STEVENS AND WILLIAM IMRIE MANN, OF BRADDOCK, PA.

LUBRICATOR.

SPECIFICATION forming part of Letters Patent No. 283,361, dated August 14, 1883.

Application filed December 6, 1882. (No model.)

*To all whom it may concern:*

Be it known that we, RICHARD STEVENS, a subject of Great Britain, and WILLIAM IMRIE MANN, a citizen of the United States, residents of Braddock, in the county of Allegheny and State of Pennsylvania, have invented a new and useful Lubricator, of which the following is a specification.

Our invention belongs to that class of lubricators which are dependent for their action upon the movement of the machinery to which they are attached, thus supplying the lubricating material when and while it is required, and cutting off the supply when no longer necessary.

Our lubricator is intended principally for use on the cylinders of steam, blast, and gas engines, the valve in the lubricator which regulates the supply of the lubricant being acted upon and worked directly by the steam, air, or other compressed vapor or gas in the cylinder, chest, pipe, or other part to which it is connected. The lubricator is peculiarly adapted to the use of dry plumbago, grease, and oils which are too thick to pass freely through ordinary lubricators.

Figure 1:
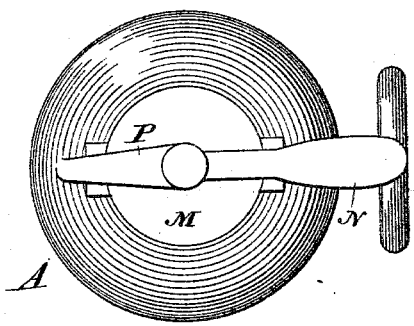
Figure 4:
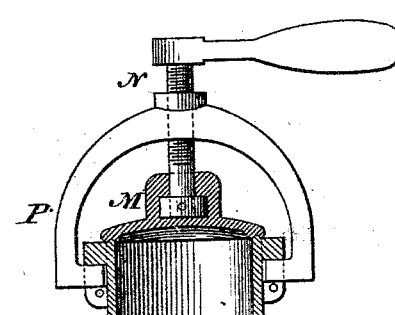
Figure 2:
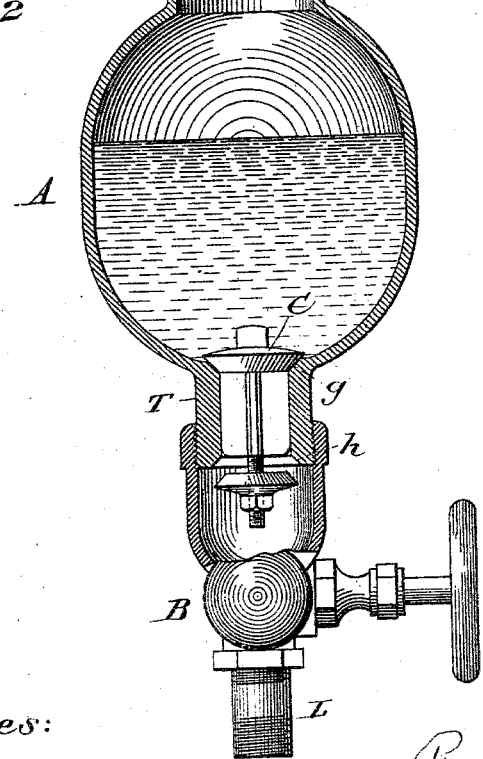
Figure 3:
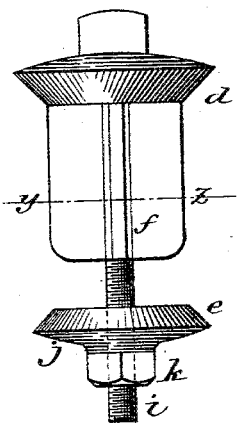

In the drawings, Figure 1 is a plan or top view of the lubricator. Fig. 2 is a vertical section of the same. Fig. 3 is an enlarged elevation of the reciprocating valve, and Fig. 4 is a cross-section of the valve on the line $y\ z$. This valve, Figs. 3 and 4, is composed of two principal parts, the upper and largest part having the face $d$, the wings $f$, and the screw $i$. Upon the screw $i$ is carried a smaller part or valve, $j$, having the face $e$. The part $j$ may be tapped to fit the screw $i$ and fixed on the screw at any point by the jam-nut $k$, or it may be secured in any other convenient way which will allow of the adjustment of the distance between the faces $d$ and $e$. For some purposes this valve may be made in one piece without the adjustable or variable feature, but retaining the two faces $d$ and $e$. When speaking of this double-faced valve as a whole, we will designate it by the letter C, as marked and shown in Fig. 2.

A is the reservoir.

B is a stop-cock or valve, preferably having its upper end enlarged to receive the neck of the reservoir A.

The throat T in the neck of the reservoir is provided at each end with the valve-seats $g$ and $h$. The valve C works up and down in this throat, being guided by the wings $f$, the valve-faces $d$ and $e$ making contact with the valve-seats $g$ and $h$, respectively, of the throat.

L is a pipe, by which the lubricator may be conveniently connected to the cylinder, &c., requiring lubrication.

M is a close-fitting cover, secured by the hand-screw N and yoke P.

The action of the lubricator is as follows: We will suppose it connected to the top head of the air-cylinder of a vertical blowing-engine, and the lubricant used to be pulverized plumbago in a dry state. The reservoir A is not quite filled with plumbago, the cover M replaced, and the stop-cock turned wide open. As the piston rises in the blowing-cylinder the contained air is compressed, and communicating with the lubricator through the pipe L it exerts itself against the valve C, which is forced up until its face $e$ is met by the seat $h$. The plumbago will be disturbed by the entering air; but on the closing of the valve (by the contact of $e$ and $h$) it will at once settle, a limited quantity falling into the throat T between the wings $f$ and below the face $d$ of the valve C. When the pressure of air is relieved by the descent of the piston in the blowing-cylinder, the valve C will fall, allowing its charge of plumbago to drop into the cylinder and be distributed by the incoming air. The air, which during the upward stroke of the piston passes the valve C and is compressed in the reservoir A, serves to blow the charge of plumbago out of the throat T at the dropping of the valve. This process will of course be repeated at each stroke of the engine. The charge may be regulated by altering the distance between the faces $d$ and $e$ of the valve C, as already described.

The particular use of the stop-cock B is to temporarily cut off communication to the lubricator while it is being charged with lubricant, or while the valve C is being taken out for adjustment, and for the facilitation of repairs, &c.

What we claim as our invention, and desire to secure by Letters Patent, is—

In a lubricator, the combination of the reservoir A, having a free outlet at its lower end, in which is the throat T and valve-seats $g$ and $h$, the valve C having two faces, $d$ and $e$, with a chamber between said faces, and the valve or stop-cock B below the valve C, all substantially as described.

RICHARD STEVENS.
   WILLIAM IMRIE MANN.

Witnesses:
 SIMON C. COLLIN,
 P. TORSTEN BERG.